(12) United States Patent
Allan

(10) Patent No.: US 7,160,348 B2
(45) Date of Patent: Jan. 9, 2007

(54) MIST ELIMINATION HOOD

(75) Inventor: Robert A. Allan, Kitchener (CA)

(73) Assignee: Turbosonic Inc., Waterloo (CA)

(*) Notice: Subject to any disclaimer, the term of this patent is extended or adjusted under 35 U.S.C. 154(b) by 234 days.

(21) Appl. No.: 10/892,124

(22) Filed: Jul. 16, 2004

(65) Prior Publication Data

US 2005/0028674 A1 Feb. 10, 2005

Related U.S. Application Data

(60) Provisional application No. 60/487,929, filed on Jul. 18, 2003.

(51) Int. Cl.
*B01D 45/08* (2006.01)

(52) U.S. Cl. .................... 55/462; 55/463; 55/464; 96/50; 96/53; 96/55; 96/60

(58) Field of Classification Search .......... 55/462–465, 55/DIG. 36, DIG. 46; 96/52, 55, 355, 50, 96/53, 60, 61, 57; 95/63–65, 70, 267, 272, 95/71, 72, 69, 78; 34/443, 448, 467, 480
See application file for complete search history.

(56) References Cited

U.S. PATENT DOCUMENTS

| | | | | | |
|---|---|---|---|---|---|
| 687,109 | A | * | 11/1901 | Baum | 55/423 |
| 710,655 | A | * | 10/1902 | Angell | 55/307 |
| 1,773,073 | A | * | 8/1930 | Beach | 55/441 |
| 1,813,637 | A | * | 7/1931 | Powers | 55/410 |
| 2,357,355 | A | | 9/1944 | Penney | 96/27 |
| 3,104,963 | A | * | 9/1963 | Bonnett | 55/332 |
| 3,403,497 | A | * | 10/1968 | Vander Mey | 95/210 |
| 3,584,440 | A | * | 6/1971 | Vigil | 96/250 |
| 3,605,386 | A | * | 9/1971 | Erwin et al. | 96/236 |
| 3,721,069 | A | * | 3/1973 | Walker | 55/319 |
| 3,745,751 | A | | 7/1973 | Zey et al. | 422/161 |
| 3,798,883 | A | * | 3/1974 | Heeney | 55/456 |
| 4,704,363 | A | * | 11/1987 | Ziegler | 435/293.1 |
| 5,855,652 | A | | 1/1999 | Talley | 96/44 |
| 2004/0221720 | A1 | * | 11/2004 | Anderson et al. | 95/272 |
| 2005/0229780 | A1 | * | 10/2005 | Spink et al. | 95/65 |

FOREIGN PATENT DOCUMENTS

| | | | |
|---|---|---|---|
| GB | 556 939 A | 10/1943 | |
| JP | 52-1574 | * 1/1977 | 96/355 |
| WO | WO 92/19380 A | 11/1992 | |

* cited by examiner

*Primary Examiner*—Richard L. Chiesa
(74) *Attorney, Agent, or Firm*—Michael I. Stewart; Sim & McBurney

(57) ABSTRACT

A mist elimination device in the form of a hood for the removal of moisture from a gas stream treated by a WESP includes a series of gutters on the outer surface of the hood to trap liquid droplets and direct the moisture to channels to drain to the lower region of a housing. Gutters are also provided on the interior surface of the hood to catch liquid droplets carried by the gas stream into the interior of the hood.

5 Claims, 5 Drawing Sheets

MIST ELIMINATION HOOD

FIELD OF INVENTION

The present invention is concerned with a mist elimination hood for a wet electrostatic precipitator system to remove moisture from a gas stream.

BACKGROUND OF THE INVENTION

Wet electrostatic precipitators (WESP) have been used for many years to remove dust, acid mist and other particulates from water-saturated air and other gases by electrostatic means. In a WESP, particulates and/or mist laden water-saturated air flows in a region of the precipitator between discharge and collecting electrodes, where the particulates and/or mist is electrically charged by corona emitted from the high voltage discharge electrodes. As the water-saturated gas flows further within the WESP, the charged particulates matter and/or mist is electrostatically attracted to grounded collecting plates or electrodes where it is collected. The accumulated materials are continuously washed off by both an irrigating film of water and periodic flushing.

This type of system is used to remove pollutants from the gas streams exhausting from various industrial sources, such as incinerators, coke ovens, glass furnaces, non-ferrous metallurgical plants, coal-fired generation plants, forest product facilities, food drying plants and petrochemical plants.

The elimination of free moisture (mist) from the gas stream discharging from the WESP is often provided by mesh pads or chevrons located at the outlet from the WESP. Both have problems associated with them. Mesh pads are best suited for the removal of entrained droplets from particulate-free stream, with high removals being achieved at low micron sizes. However, pads often suffer plugging problems where fiber, particulates and/or VOCs (tars and sublimates) are present in the gas stream. Chevrons provide a high efficiency entrainment separation with limit drop sizes of 15 to 25 microns, depending on gas velocity and blade spacing, but can also suffer from plugging problems. These problems, in turn, lead to regions of excessive velocity causing droplet re-entrainment and carry-over.

SUMMARY OF INVENTION

The present invention provides a novel mist elimination device which replaces conventional mesh pads and chevrons.

In the present invention, the gas exiting the WESP passes downwardly into an open-topped housing and over an outer hood surface within the housing and then upwardly to an outlet communicating with an upper region of the hood. Liquid droplets accumulate and are drained from a lower end of the housing. Such hood structures have previously been used to attempt to remove the liquid droplets but exhibit considerable moisture carry-over into the exhaust gas stream, especially under flushing conditions.

In accordance with the present invention, the problems of the prior art hood arrangement are decreased and exhaust gas stream can be provided with minimal or non-detectable carry-over by providing on the outer hood surface a series of gutters which trap water droplets and direct the moisture to the channels to drain into the lower region of the housing. In addition, gutters are also provided on the interior surface of the hood to catch liquid droplets carried by the gas stream into the interior surface of the hood to drip down into lower region of the housing, to the moisture outlet from the housing.

The present invention, in addition to overcoming the problems associated with prior hood structures, overcomes the inherent limitations and drawbacks of mesh pads and chevrons. The mist elimination device of the invention prevents liquid droplet carryover, both during normal operation and during flushing of the WESP. No additional mist elimination device is required. The mist elimination device of the invention requires no maintenance, a considerable advantage over the mesh pads and chevrons.

DESCRIPTION OF PREFERRED EMBODIMENT

Figure 1:
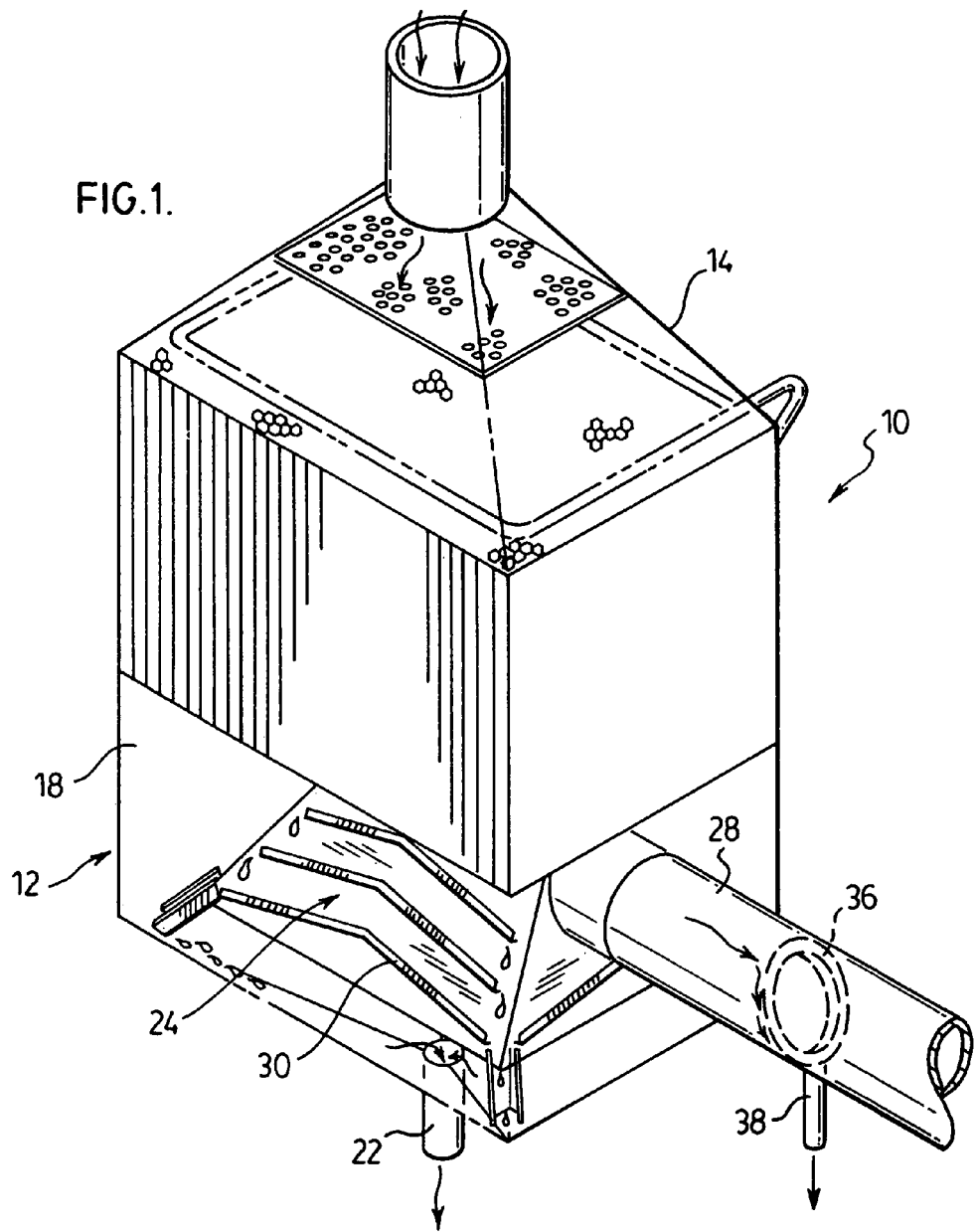
FIG. 1 is a perspective view of WESP incorporating a mist eliminator according to one embodiment of the invention.
Figure 5:
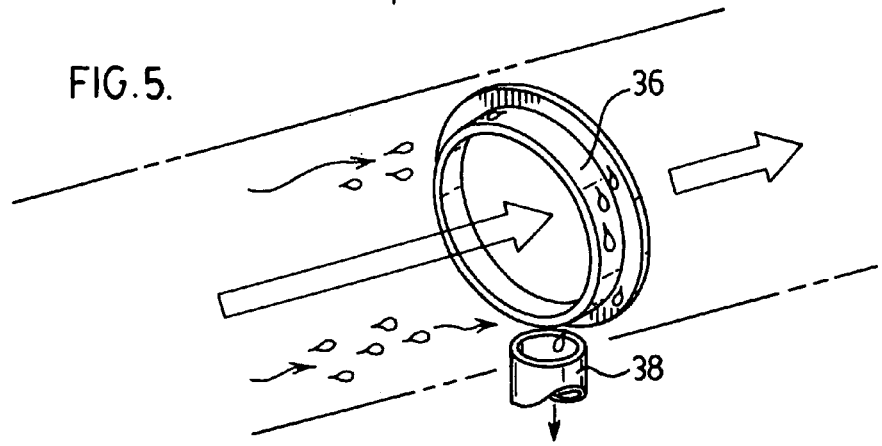
FIG. 5 is a detail view of a ring channel.
Figure 2:
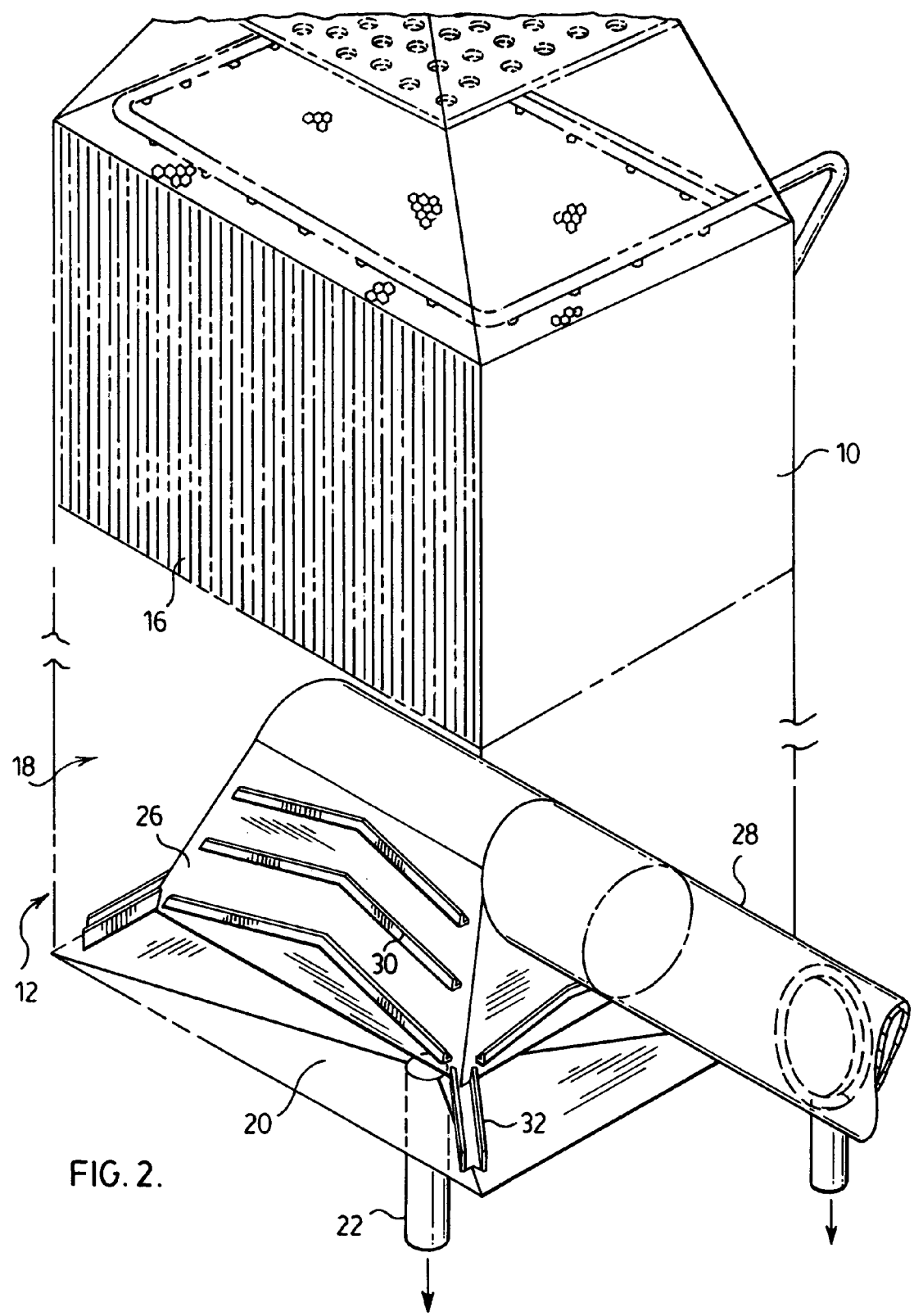
FIG. 2 is a close-up view of the mist eliminator of FIG. 1.
Figure 4:
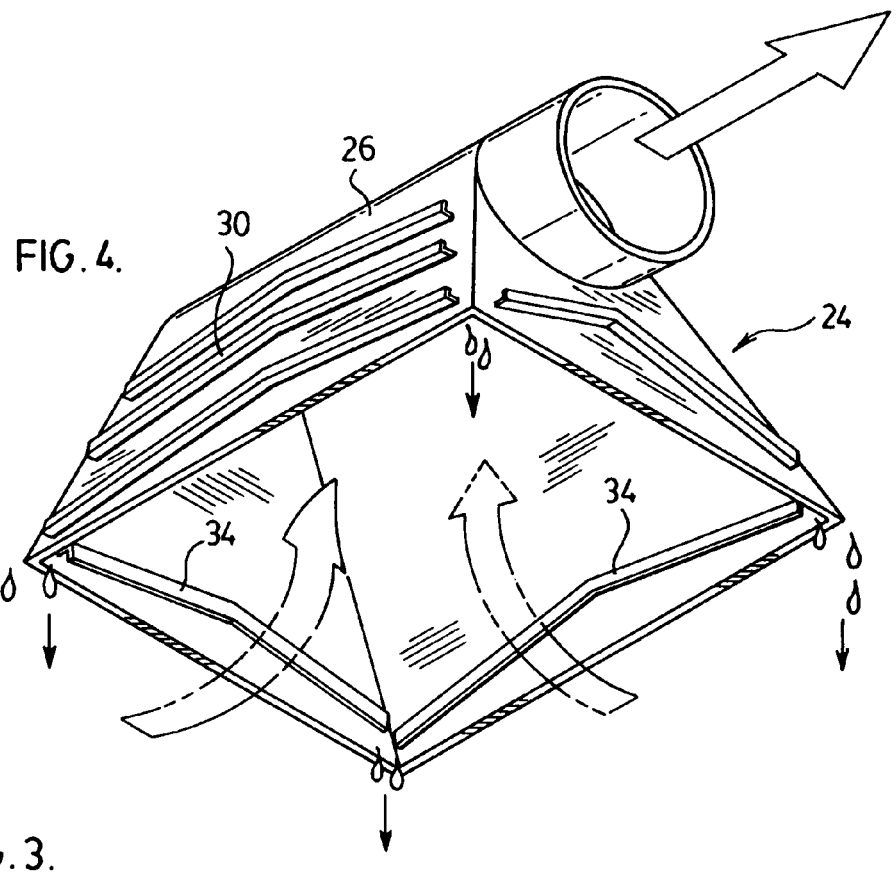
FIG. 4 is a perspective view from below of the mist eliminator of FIG. 1.
Figure 3:
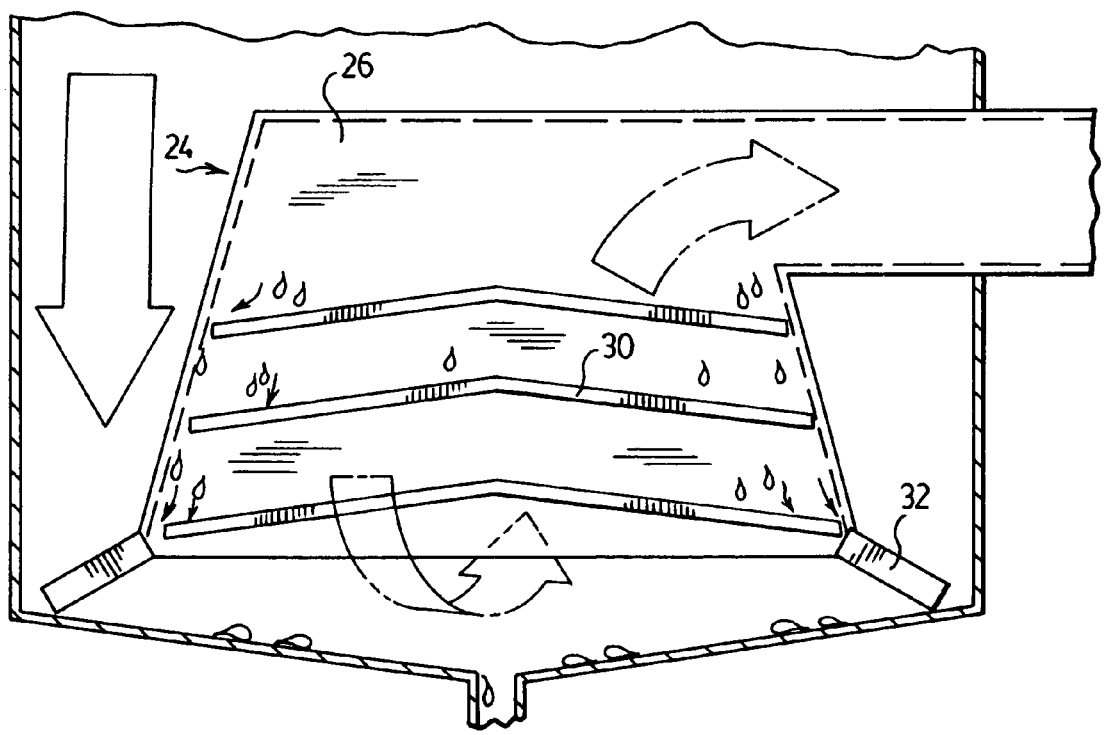
FIG. 3 is an elevational view of the hood structure.

In the drawings, preferred embodiments of the invention are illustrated by way of Example. It is to be expressly understood that the description and drawings are only for the purpose of illustration and as an aid to understanding, and are not intended to be a definition of the limits of the invention.

Referring first to FIGS. 1 to 5 of the drawings, FIG. 1 shows a WESP installation 10 modified to include a mist eliminator 12 constructed according to one embodiment of the invention. The WESP installation is of conventional construction comprising vertically arranged comprising discharge electrodes and collecting electrodes. Any desired arrangement of such elements may be employed, including square tube, round tube, hexagonal tube or plate. A moisture-laden gas stream to be treated is fed through an inlet header 14 to the upper inlet to the WESP down through the tubes containing the electrodes to the lower outlet 16.

Connected to the lower outlet 16 is the mist eliminator device 12 provided in accordance with one embodiment of the present invention. The mist eliminator device 12 includes a chamber 18 having a sloped bottom wall 20 to a moisture outlet 22. Inside the chamber 18 is a hood 24 comprising upwardly sloping walls 26.

The mist eliminating device 12 accelerates the gas flow entering the device, causing droplets of free moisture to accelerate downward and then break free of the gas stream as the gas stream turns approximately 180 degrees into the interior of the hood 24 and from there to the gas outlet 28 from the chamber.

A problem of moisture moving down the outer wall 26 of the hood 24 and dripping off the edge of the hood 24 to be swept into the exiting gas stream, is eliminated by providing a series of drip rings or guides or gutters 30 on the external walls 26 of the hood 24. The gutters 30 are downwardly sloping from an apex to guide the moisture on the hood to the sides of the walls and then to drains 32 from which the accumulated moisture drops into the lower portion of the chamber 18 to the moisture outlet 22.

To capture any moisture which may be swept into the gas stream, further gutters 34 are provided on the interior wall of the hood 24. In order to capture any moisture which may remain or accumulate on the inner walls of the gas outlet 28 and which is swept along by the gas stream, a ring channel 36 may be provided on the inner wall of the outlet 28 with any collected moisture draining through drain 38 to the moisture outlet.

The gutters 30 may also provide structural support to the hood 28.

Figure 6:
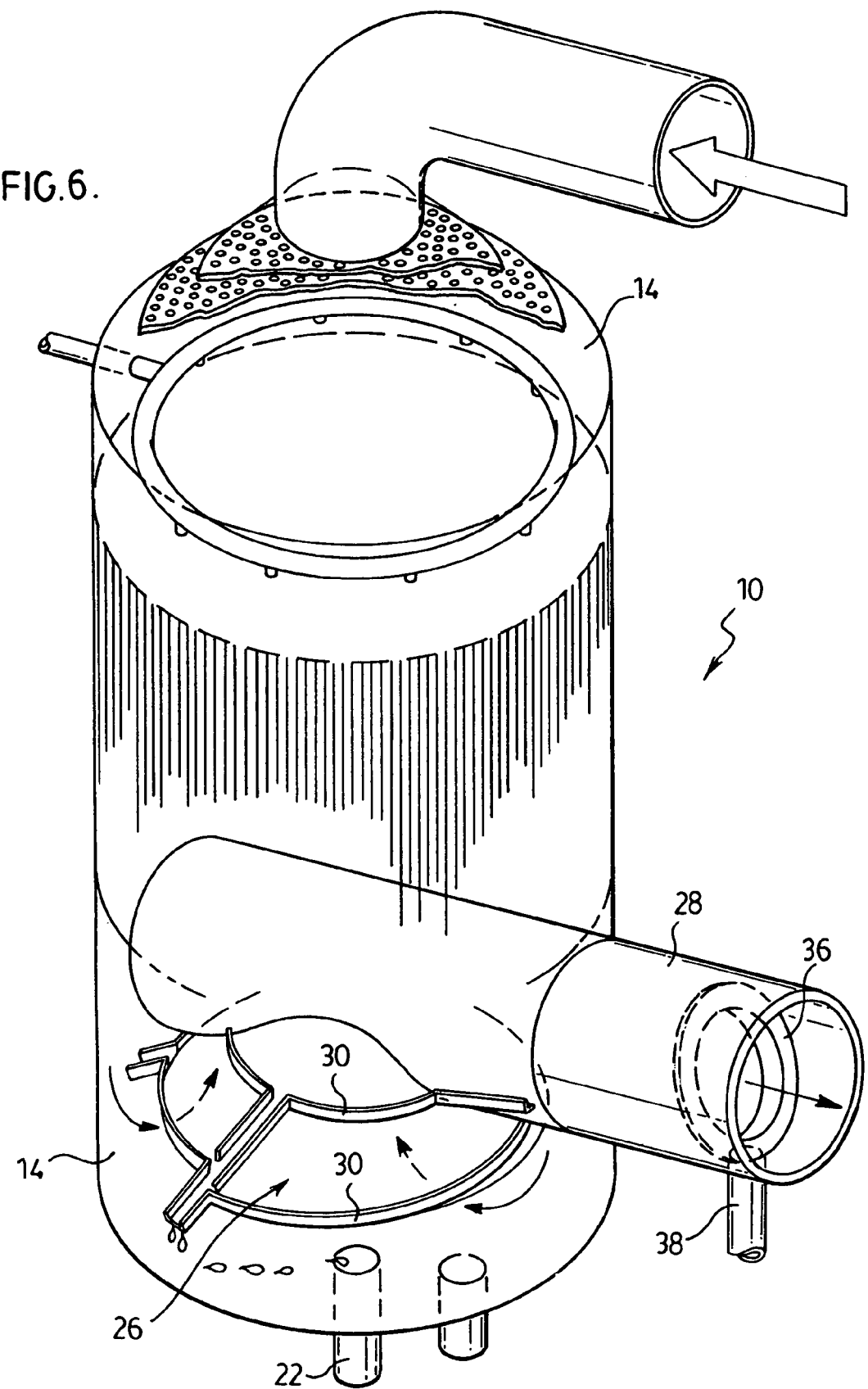
FIG. 6 is a perspective view of a WESP incorporating a mist eliminator according to another embodiment of the invention.
Figure 7:
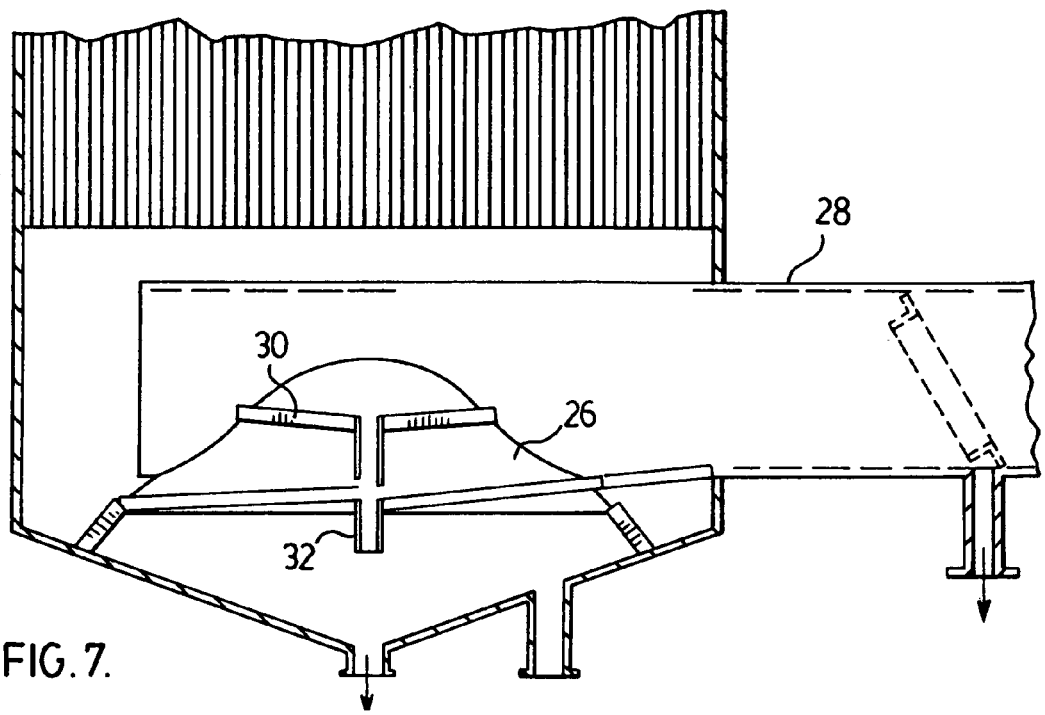
FIG. 7 is an elevational view of the mist eliminator hood of FIG. 6.
Figure 8:
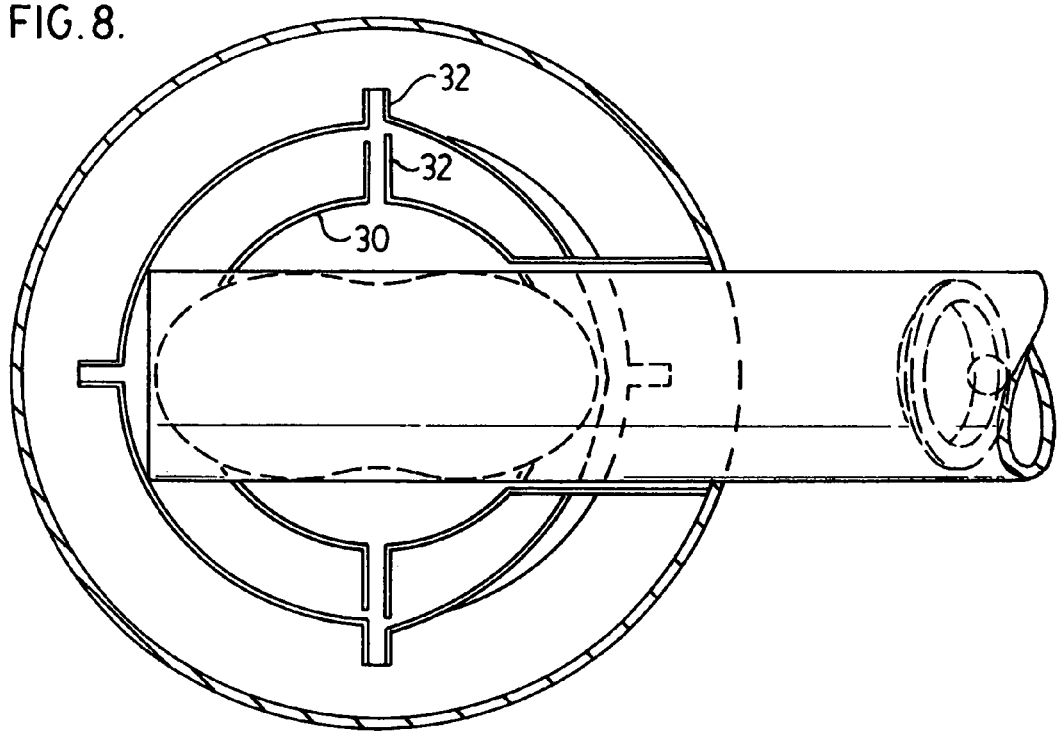
FIG. 8 is a view from above of the mist eliminator hood of FIG. 6.

Turning now to FIGS. 6 to 8, there is shown thereon an embodiment of the invention in which the WESP is of circular cross-section. The same reference numerals are utilized to identify the equivalent parts.

EXAMPLES

Example 1

This Example illustrates the results obtained using a laboratory scale WESP structure.

A ⅛ scale model of a commercial rectangular cross-section WESP structure was set up as illustrated in FIGS. 1 to 5. The model extended from the WESP inlet, through the collection tubes and into the outlet hood and duct. The humidification spray nozzle was simulated using a single multi-orifice air atomized spray nozzle operated at 50 to 60 psi to ensure good atomization and fine droplet size.

In the absence of the gutters provided in the hood, there was strong visual evidence of a significant amount of water being carried into the outlet duct, particularly during a tube wash operation. However, with the addition of the water collection gutters to the outside of the hood, the amount of liquid observed to be carried over was significantly reduced.

The liquid carryover was determined by droplet counters and the average carryover was 0.000764 US gpm/ft$^2$. With the wash spray on, the carryover was increased to only 0.00542 US gpm/ft$^2$.

After several minutes of operation, liquid began to accumulate on the duct walls and ran along the surface, not being measured by the droplet counters in the outlet duct. A ring channel was added to the interior of the hood to capture the accumulated liquid from the duct walls.

Example 2

This Example illustrates the results obtained using a further laboratory scale WESP structure.

A ⅙ scale model of a circular cross-section WESP structure was set up as illustrated in FIGS. 6 to 8, with the gutters in place. The model extended from the horizontal inlet duct through the WESP vessel to the outlet duct. The humidification spray nozzle was a single multiple-orifice air-atomized spray nozzle operated at 50 psig to ensure good atomization and fine droplet size with a mean of 27 microns.

The WESP flush sprays were simulated by a 8 Bete WL-1/4 60 degree hydraulic nozzles mounted on a ring header at equal spaces. During wash simulation, the header was operated at a flow rate of 6 usgpm at approximately 10 psig.

The liquid carryover to the outlet duct was determined by droplet counters. With only the inlet spray operating, the carryover was $4.43 \times 10^{-10}$ usgpn/ft$^2$ with an average droplet size in the outlet duct of 3.2 microns. With only the flush sprays operating, the carryover was $6.06 \times 10^{-8}$ usgpm/ft$^2$ with an average droplet size of 20.6 microns. With both sprays operating, the carryover was $9.07 \times 10^{-9}$ usgpm/ft$^2$ with an average droplet size of 12.1 microns.

There was little airborne water observed entering the outlet ductwork, as seen from these measurements. Any liquid running along the wall of the outlet duct, resulting from droplet impingement on the duct walls and condensation, was captured by an additional gutter or collection channel at the outlet.

Example 3

This Example illustrates the results obtained using a plant scale WESP structure.

A rectangular full scale mist eliminator hood structure as illustrated in FIGS. 1 to 5 was installed to replace an existing mesh pad arrangement which was causing operational problems due to plugging and free moisture carryover from the WESP.

The installation reduced moisture carryover to values below detection as measured using EPA Method 5 and has been operating for more than eight months without maintenance or interfering with production.

SUMMARY OF DISCLOSURE

In summary of this disclosure, the present invention provides a novel mist elimination hood for a WESP system that removes specific amount of moisture from the gas stream while avoiding the problems of plugging and maintenance associated with the most commonly-employed mist elimination systems. Modifications are possible within the scope of the invention.

What I claim is:

1. A mist elimination device for removal of moisture from a gas stream, which comprises:
   a chamber having an upper inlet for a flow of the gas stream, a lower outlet for collected liquid and a second outlet for a product gas stream,
   a hood located generally axially in said chamber having walls sloping downwardly from an upper crown to a lower extremity defining an exterior and a space beneath the hood,
   at least one moisture collection channel provided on the exterior surface of said walls positioned to collect liquid on said walls and guide the collected liquid to at least one flow channel positioned to direct collected liquid to below the hood,
   at least one moisture collection channel provided on an interior surface of the walls positioned to collect liquid entrained in the gas stream and passing from the exterior of the hood into the space beneath the hood, and
   an outlet duct communicating with the space beneath the hood and joined to the second outlet for guiding gas entering the space beneath the hood to the second outlet.

2. The mist elimination device of claim 1, wherein said chamber and said hood have a rectangular or square cross-sectional shape.

3. The mist elimination device of claim 1, wherein said chamber and said hood have a round or oval cross-sectional shape.

4. The mist elimination device of claim 1, further comprising an additional moisture collection channel positioned on an interior surface of the outlet duct positioned to collect liquid running along the interior surface of the outlet duct.

5. A mist elimination precipitator assembly for the treatment of a gas stream containing particulates, comprising:
an upper inlet and a lower outlet,
electrostatic precipitator elements extending from the upper inlet to the lower outlet for removing contaminants from a gas stream passing from the upper inlet to the lower outlet,
a gas stream which has been saturated with moisture passing through the electrostatic precipitator elements,
means for flushing and/or irrigating the electrostatic precipitator elements, and
a mist elimination device in unobstructed fluid flow communication with the lower outlet for removing entrained droplets from the gas stream, said mist elimination device being as claimed in claim 1.

* * * * *